Figures 1, 2, 3, 4, 5, 6, 7:
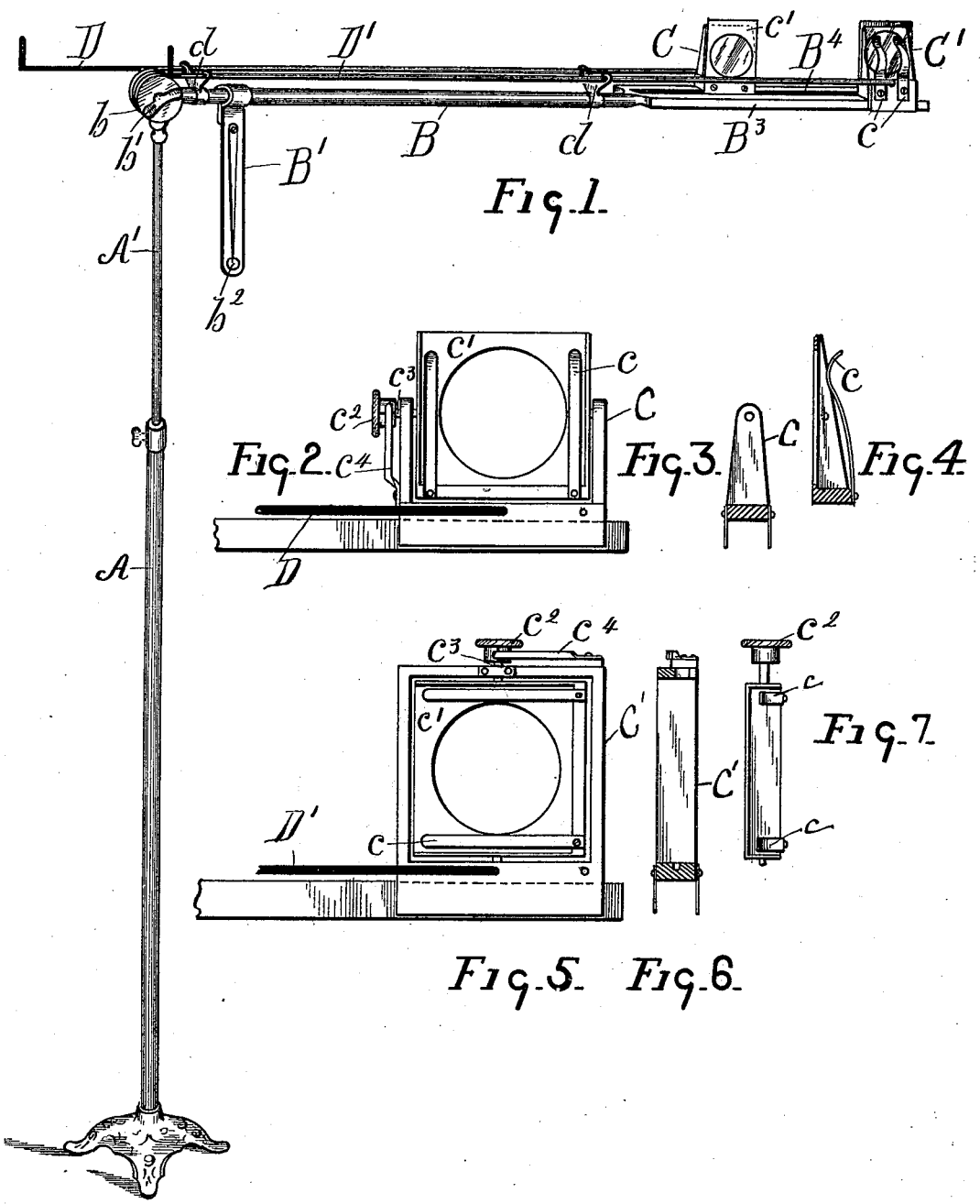

(No Model.) 2 Sheets—Sheet 1.

C. M. C. PRENTICE.
APPARATUS FOR TESTING EYES.

No. 522,027. Patented June 26, 1894.

WITNESSES
D. W. Bradford
F. Clough.

INVENTOR
Chalmer M. C. Prentice
by Parker & Burton
his Attorneys.

THE NATIONAL LITHOGRAPHING COMPANY,
WASHINGTON, D. C.

(No Model.) 2 Sheets—Sheet 2.

C. M. C. PRENTICE.
APPARATUS FOR TESTING EYES.

No. 522,027. Patented June 26, 1894.

WITNESSES
J. W. Bradford
F. Clough.

INVENTOR
Chalmer M. C. Prentice
by Parker & Burton
his Attorneys.

UNITED STATES PATENT OFFICE.

CHALMER M. C. PRENTICE, OF WATERTOWN, SOUTH DAKOTA.

APPARATUS FOR TESTING EYES.

SPECIFICATION forming part of Letters Patent No. 522,027, dated June 26, 1894.

Application filed October 5, 1891. Serial No. 407,817. (No model.)

*To all whom it may concern:*

Be it known that I, CHALMER M. C. PRENTICE, a citizen of the United States, residing at Watertown, county of Coddington, State of South Dakota, have invented a certain new and useful Improvement in Apparatus for Testing the Eyes; and I declare the following to be a full, clear, and exact description of the invention, such as will enable others skilled in the art to which it pertains to make and use the same, reference being had to the accompanying drawings, which form a part of this specification.

My invention relates to a new and improved apparatus for making eye muscle tests, and having for its object to ascertain with a greater degree of certainty the actual comparative condition of the recti-muscles of the eyes, and especially develop latent difficulties not discoverable by the old method of testing, and at the same time furnish means whereby the correction thereof can be indicated.

Heretofore, muscle tests for eyes have been exceedingly simple, and especially defective in certain particulars arising from the nature of the test and in the natural operation of the muscles of the eyes, and were very inaccurate in measuring the necessary corrections. The mode of testing and the mechanism employed therefor consisted in, first, the employment of a single transparent prism before one eye to produce double vision, and drawing conclusions from the relative position of the two objects thus seen when double vision is accomplished. If when double vision was produced the two objects were found to be either perfectly horizontal or perfectly perpendicular, depending upon whether the double vision was lateral or perpendicular, the eyes were assumed to be normal and that each was controlled by the action and equal strain of the muscles controlling the eye ball. If, on the contrary, there was a variation from the horizontal or perpendicular lines, then the amount of irregularity was roughly determined by placing before the eye prisms of known different degrees, until the double object was brought to a horizontal or perpendicular, and the degree of the prism necessary to accomplish this was held to be the degree of the irregularity. The defect in this mode of measurement resides principally in the fact that there is a strong physiological involuntary tendency to horizontalize or verticalize, which is sufficient usually to overcome all degrees of variation up to about eight degrees, and thus bring the images into a vertical or horizontal line. If a higher degree prism be used to destroy the possibility of verticalization, the tendency to horizontalize remains undisturbed, and its result might be wholly unknown. So if a prism is used sufficiently to destroy the tendency to horizontalize, the tendency to verticalize would overcome the latent defect which would thus be wholly unknown. Those defects which are thus found by the old method I term "manifest irregularities," while those that remain undetected by such mode I term "latent irregularities."

The purpose of my apparatus is to first produce double vision, either horizontal or vertical, by the use of a prism to such a degree as to practically destroy the tendency of the eyes to horizontalize or verticalize; and second, to use before the same eye another prism to throw the vision thereof at right angles a sufficient distance to destroy the tendency of the muscles to unite upon either the horizontal or vertical line, as the case may be; and third, to employ a scale as the object of vision with which double vision is thus produced, arranged at the proper distance from the eye corresponding to the degrees of the prism, so that a comparison of the visions of the divisions of the scale when thus produced, if varied one degree shall indicate one degree of variation in the eye, two degrees shall indicate two degrees, &c.; fourth, reversing the process and thus checking off by a variety of tests the results of any single one until the final amount of error is determined.

It is necessary to use the fourth step, because of the varying tendency of the muscles in any one test as compared with another, and hence a variety must be used in order to determine from an average of them all the amount of latent divergence in muscular action.

In the drawings, Figure 1 is a view of my prism holder. Fig. 2 is a view of a variation of the holder proper, adapted to invert the prism. Fig. 3 is an end elevation of the frame of the holder shown in Fig. 2. Fig. 4 is a vertical section of the holder shown in Fig. 2.

Figure 8:
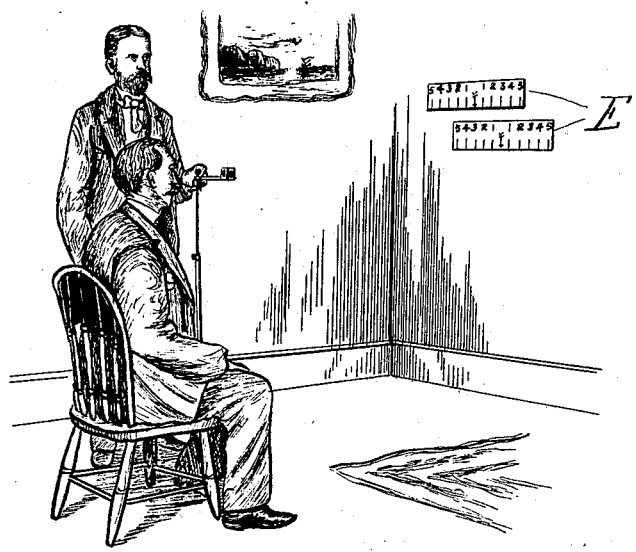
Figure 9:
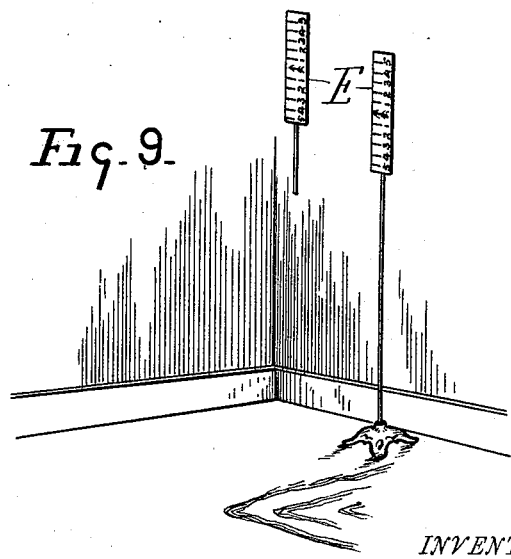

Fig. 5 is a view of a prism holder adapted to be reversed in a plane at right angles to that shown in Fig. 2. Fig. 6 is a vertical section of that shown in Fig. 5. Fig. 7 is an end elevation of the same. Fig. 8 is a view showing the manner of using my apparatus, and the scale employed therewith. Fig. 9 shows the scale used by me in connection with the prism carrier.

In the drawings, A is a suitable vertical support or standard, provided with a plunger A' supporting the prism carrier, and adapted to adjust vertically from the standard A. B is the horizontal support for the carrier, and is pivoted to the top of A', with a friction joint $b$, adapting it to be adjusted vertically, and held with a set screw $b'$ at the joint. By this construction, I am enabled to adjust the support vertically until the carrier is exactly horizontal; and I provide the indicator B', having a gravity index $b^2$ to indicate when the carrier is in a horizontal position. The outer end of the carrier is bifurcated, and the arms $B^3$ and $B^4$ adapted to carry the sliding prism holders C and C'. These holders have independent horizontal movement on the carrier, and I provide switch rods D and D', horizontal movement in suitable supports $d$ on the carrier, and each engaged at one end with one of the holders, and provided at the other end with any suitable handle. By means of these rods, the prism holders may be moved backward and forth on the arms of the carrier at will, from a position at one side of the apparatus.

The prism holders shown in Fig. 1 are not arranged to reverse the prisms, except by removing them. They are provided with springs, braces, or brackets $c$ $c$, adapted to hold the prisms up against the face of the upright portion $c'$ of the holder, and thus determine its vertical position. This upright portion may be inclined at a sufficient angle so that the prism supported by it will have its plane exactly vertical.

In the holder shown in Fig. 2, the portion $c'$ is supported in any suitable frame, and pivoted so as to be inverted. The purpose of this is to provide for inverting the prism without removing it from the holder. While this is not essential to my invention, it is a desirable construction, and one I desire to cover in my claims.

I provide for inverting the holder with the thumb screw $c^2$, and provide this thumb screw with two slots $c^3$, one on each side, in which a spring stop $c^4$ engages and supports the holder vertically in two positions. In Fig. 5, the construction is similar to that in Fig. 2, except that the prism holder is adapted to be reversed, and it is provided with arrangements like those in Fig. 2 for holding it in its reversed position. In using these reversible prism holders, I prefer to use one of each construction on the carrier, so by their combined movements I may produce almost any deflection of the vision of one eye, or both eyes, as I may desire. Thus I may deflect the vision of one eye laterally by the use of the prism set in the holder, shown in Fig. 5, and then, by switching the other prism holder, such as shown in Fig. 2, before the same eye, throw the vision of the same eye vertically. I may then, by reversing the first prism holder, throw the vision of that eye laterally in the opposite direction, or I may invert the second prism holder and throw it vertically in the opposite direction from that of the first test, thus a large number of tests can be made which will be largely in excess of any test possible under any apparatus as now disclosed by the state of the art.

In Fig. 8, I show the scale E employed by me in connection with my prism carrier, which consists of a rectangular card, having printed on its center an arrow, and having printed a scale of degrees on each end, running from 1 to 6. I prefer to have the figures on one side of the arrow printed in red, and on the other side in black. In using this scale, I have it so proportioned that, if it be placed at a certain number of feet from the prism holder, (I prefer twenty feet,) its scale will indicate the degrees of a correct prism, so that, if, as in the drawings, the three degree prism be placed before the left eye, the scale will be seen by the patient to be deflected exactly three degrees, if the eyes be normal.

In the drawings, the position of the scale indicates that a prism has been used of three degrees lateral deflection, and that a prism has been used of a certain degree of vertical deflection to set the views of the scale one above the other, and, as I have stated, if the eyes be normal, the scale would indicate, as in the drawings, three degrees lateral deflection. It is manifest that this scale can be set at right angles to that shown in the drawings, and I prefer to provide a scale mounted on a standard and centrally pivoted, as shown in Fig. 9. In this figure, double vision is indicated, exactly corresponding to that seen by a patient when, we will say, an eight degree prism of lateral deflection has been used, and a three degree prism of vertical deflection has been used.

It is manifest that a large number of tests, varying in their character, may be made by the use of my prism carrier with its switch prism holders, in connection with the scale, as shown and described; and I have found that I can make some forty different combinations. These combinations may be made to suit the convenience or the practice of the optician making the tests, to check or vary the original ones, and to determine the exact degree of correction required.

What I claim is—

1. In an apparatus for testing the eyes, a horizontal prism carrier, movable prism holders mounted on said carrier and adapted to be switched independently of each other, substantially as described.

2. In an apparatus for testing the eyes, a horizontal prism carrier, movable prism holders mounted on said carrier and adapted to be switched independently of each other, and switch rods for operating said prism holders, substantially as described.

3. In an apparatus for testing the eyes, a vertical standard, a horizontal prism carrier, movable prism holders mounted on said carrier, and means for moving said holders by the operator from the opposite side of the standard, substantially as described.

4. In an apparatus for testing the eyes, a horizontal prism carrier adapted to carry two prism holders, two prism holders movably mounted on said carrier, one adapted to be inverted in its frame, and the other reversed laterally, substantially as described.

5. In an apparatus for testing the eyes, a horizontal prism carrier, two prism holders one for each eye mounted on said carrier, and a scale in the field of vision adapted to measure the effect of prisms on the binocular vision of a patient, substantially as described.

6. In an apparatus for testing the eyes, a horizontal prism carrier, two prism holders movably mounted on said carrier, and having movement independent of each other, and a scale in the field of vision, adapted to measure the effect of prisms on the binocular vision of a patient, substantially as described.

7. In an apparatus for testing the eyes, a horizontal prism carrier, two prism holders mounted on said carrier, and a reversible scale in the field of vision adapted to measure lateral and vertical deflections produced by prisms, substantially as described.

8. In an apparatus for testing the eyes, the combination of a vertically adjustable standard, a prism carrier swiveled to said standard and adapted to be adjusted to said horizontal position, and independently movable prism holders mounted on said carrier adapted to be switched independently of each other, and an index to indicate when said carrier is in a horizontal position, substantially as described.

In testimony whereof I sign this specification in the presence of two witnesses.

CHALMER M. C. PRENTICE.

Witnesses:
MARION A. REEVE,
CHAS. H. FISK.